(12) United States Patent
Schaefer

(10) Patent No.: US 8,037,994 B2
(45) Date of Patent: Oct. 18, 2011

(54) APPARATUS AND METHOD FOR SORTING NON-SORTED CONTAINERS IN AN ORDER-PICKING SYSTEM

(75) Inventor: Gerhard Schaefer, Neunkirchen (DE)

(73) Assignee: SSI Schaefer Peem GmbH, Graz (AT)

( * ) Notice: Subject to any disclaimer, the term of this patent is extended or adjusted under 35 U.S.C. 154(b) by 318 days.

(21) Appl. No.: 12/175,772

(22) Filed: Jul. 18, 2008

(65) Prior Publication Data

US 2009/0026041 A1 Jan. 29, 2009

Related U.S. Application Data

(63) Continuation of application No. PCT/EP2007/000401, filed on Jan. 18, 2007.

(30) Foreign Application Priority Data

Jan. 19, 2006 (DE) .......... 10 2006 003 270

(51) Int. Cl.
B65G 47/26 (2006.01)

(52) U.S. Cl. .......... 198/456; 198/580; 198/597

(58) Field of Classification Search .......... 198/456, 198/580, 597, 457.01, 463.2
See application file for complete search history.

(56) References Cited

U.S. PATENT DOCUMENTS

| 5,678,680 | A | * | 10/1997 | Wellinger .......... 198/418.2 |
| 5,794,534 | A | | 8/1998 | Enderlein et al. |
| 5,806,434 | A | | 9/1998 | Enderlein et al. |
| 6,561,339 | B1 | * | 5/2003 | Olson et al. .......... 198/349 |
| 6,677,548 | B2 | | 1/2004 | Kobu et al. |
| 6,690,996 | B2 | * | 2/2004 | Seiler .......... 700/228 |
| 6,698,575 | B2 | * | 3/2004 | Gartner .......... 198/465.4 |
| 6,784,391 | B2 | * | 8/2004 | Takizawa .......... 209/583 |
| 6,813,539 | B2 | * | 11/2004 | Morimoto et al. .......... 700/215 |
| 6,968,937 | B2 | * | 11/2005 | Mader et al. .......... 198/419.1 |
| 6,975,998 | B1 | * | 12/2005 | Jones .......... 705/8 |
| 7,400,256 | B2 | * | 7/2008 | Knopik et al. .......... 340/573.1 |
| 7,766,151 | B2 | * | 8/2010 | Schaefer .......... 198/370.04 |
| 7,809,467 | B2 | * | 10/2010 | Schaefer .......... 700/216 |

FOREIGN PATENT DOCUMENTS

| DE | 40 33 184 A1 | 4/1992 |
| DE | 94 06 061 U1 | 8/1995 |
| DE | 195 18 298 A1 | 11/1995 |
| DE | 295 19 354 U1 | 5/1996 |
| DE | 297 24 039 U1 | 9/1999 |
| DE | 100 39 394 C1 | 9/2001 |
| DE | 10 2004 001 181 A1 | 8/2005 |
| EP | 1 331 179 A1 | 7/2003 |
| JP | 2001 240 241 A | 9/2001 |

* cited by examiner

*Primary Examiner* — Joseph A Dillon, Jr.
(74) *Attorney, Agent, or Firm* — Kevin J. McNeely; McNeely, Hare & War LLP

(57) ABSTRACT

A method and an apparatus or system for sorting non-sorted containers in a predetermined sequence in an order-picking system includes a main conveying track by means of which the non-sorted containers are transported within the order-picking system, in particular to an order-picking workstation or into a container store, in a main conveying direction. The apparatus includes a conveying-track circuit, which can be connected to the main conveying track via an introduction point, for introducing containers into the conveying-track circuit, and via a discharge point, for discharging containers which are located in the conveying-track circuit. At least one transfer device is arranged within the conveying-track circuit such that containers can be exchanged between a first exchange point and a second exchange point of the conveying-track circuit.

19 Claims, 4 Drawing Sheets

APPARATUS AND METHOD FOR SORTING NON-SORTED CONTAINERS IN AN ORDER-PICKING SYSTEM

RELATED APPLICATIONS

This a continuation application of the co-pending international patent application filed on Jan. 18, 2007, the international application claiming priority of the German patent application DE 10 2006 003 270.5 filed on Jan. 19, 2006, which is fully incorporated by reference herewith.

BACKGROUND OF THE INVENTION

The present invention relates to an apparatus for sorting non-sorted containers in an order-picking system, to a correspondingly equipped order-picking system and to a method for sorting non-sorted containers.

RELATED PRIOR ART

In conventional order-picking systems, storage containers are trans-ported from a container store to order-picking workstations where an order-picking person removes articles from the storage containers. The order-picking person introduces the articles which have been removed into an order container. Each order container is assigned an order. An order contains various types of articles in varying numbers, depending on requirements.

In order for an order to be fully methoded, i.e. picked, storage containers, in which the appropriate articles are stored, have to be retrieved from the container store. This is usually done via conveyors, e.g. conveyor belts, roller conveyors, overhead conveyors, etc. The order containers are transported to and from the order-picking workstations likewise via conveyors. This type of order-picking is referred to as "goods to man".

This results in a relatively high traffic volume of containers in the order-picking system. In particular, the storage containers have to be transported to the order-picking workstation in a sequence which is predetermined (by the order). A display is usually provided at the order-picking workstation in order to indicate to the order-picking person how many articles are to be picked from the current storage container. It is therefore important for the right storage container to be supplied at the right point in time at the right location, in particular at a removal location of the order-picking workstation.

Sorting of containers is important, in particular, for shipping preparation. In this situation, the containers should be put in the correct (predetermined) order on so-called shipping tracks, from which the containers are removed, for example by drivers, for subsequent delivery.

Of course, the term "containers" should also be understood hereinbelow as including pallets, trays and the like.

The prior art also discloses parking locations arranged laterally in relation to a main conveying track. By means of such parking locations, which can usually accommodate just one container, a container can be removed from a series of multiple containers. The removed container is stored on an interim basis at the parking location until all the other containers which are located on the main track and should actually be located upstream of the parked container, as seen in the conveying direction, have passed the parked container. The parked container is then passed back again into the flow of containers on the main conveying track. The parked container is thus shifted to the rear of the sequence.

It is problematic, however, to shift a container to the front. Just by being pulled out of the main conveying track, it is not possible for a container to effectively overtake any containers which are already arranged in front of it.

A further problem is that it is not possible in the prior art for containers to be shifted "to the front" at the same time as other containers are shifted "to the rear".

It is thus an object of the present invention to provide a sorting apparatus and a method for sorting containers in an order-picking system allowing containers to overtake within a series of containers, in particular when the series of containers contains a very large number of containers and many of these containers are arranged in the incorrect sequence.

SUMMARY OF THE INVENTION

This object is achieved by an apparatus for sorting non-sorted containers in a predetermined sequence in an order-picking system. The order-picking system comprises a main conveying track by means of which the non-sorted containers are transported within the order-picking system, in particular to an order-picking workstation or into a container store, to be precise in a main conveying direction. The sorting apparatus comprises a conveying-track circuit, which can be connected to the main conveying track via an introduction point, for introducing containers into the conveying-track circuit, and via a discharge point, for discharging containers which are located in the conveying-track circuit. The sorting apparatus further comprises at least one transfer device, which is arranged within the conveyor circuit such that containers can be exchanged between a first exchange point and a second exchange point of the conveying-track circuit.

This object is also achieved by a method for organizing containers in a predetermined sequence in an order-picking system which has a sorting apparatus with a conveying-track circuit and with a transfer device, the conveying-track circuit being connected to a main conveying track of the order-picking system via an introduction point and a discharge point, and the transfer device connecting a first exchange point and a second exchange point of the conveying-track circuit to one another, and the method having the following steps: sensing a sequence of containers which are conveyed downstream via the main conveying track; checking the sequence sensed in relation to a predetermined sequence; should the sequences not match, then: discharging into the conveying-track circuit the containers for which the sequence is incorrect; determining re-sorting commands in order to activate the transfer device and/or the discharge device; communicating the re-sorting commands to the transfer device and/or to the discharge device, and executing these commands; and, should the sequences match, returning to the step of sensing the sequence of containers.

This method of sorting has the advantage that a large number of containers which are in the incorrect sequence can be re-sorted. Sorting takes place quickly. The containers on the main conveying track continue moving since, in particular, it is no longer necessary to stop the containers on the main conveying track in order to create a gap into which can be moved a container which is to be reintegrated. This increases the throughput of the system as a whole.

According to a preferred embodiment, the discharge point is upstream of the introduction point, as seen in the main conveying direction. In particular, as seen in the main conveying direction, the first exchange point is located between the discharge point and the introduction point, and the second exchange point is located between the introduction point and the discharge point.

It is also advantageous if the main conveying track forms part of the conveying-track circuit.

If the main conveying track and the circuit have a portion in common, this cuts back on at least one portion of the conveying track.

However, it may also be advantageous if the circuit is a continuous circuit which is independent of the main conveying track.

In the case of this configuration, the circuit and the main conveying track merely have a common point of intersection. This common point of intersection, in turn, corresponds both to the introduction point and to the discharge point. In particular, this point corresponds to the first exchange point. Just a single unit need therefore be provided in order to allow the transfer of containers between the main conveying track and the circuit. The number of introduction devices and discharge devices can be reduced. This is noticeable, in particular, in the acquisition costs.

According to a preferred configuration, the introduction point and the discharge point thus correspond. In particular, the first exchange point corresponds with the discharge point.

It is particularly advantageous if the conveying-track circuit is arranged essentially in a horizontal plane.

A sorting apparatus designed in this way can be used in areas which have a particularly low ceiling height, e.g. in airports where items of baggage are transported on intermediate storeys which are not of the customary height required for people.

According to a further configuration, the main conveying track and the conveying-track circuit are realized essentially by roller conveyors, belt conveyors or overhead conveyors.

It may also be advantageous, however, if the circuit is arranged essentially in a vertical plane. In particular in this case, the circuit can then be constructed in a paternoster-like manner.

This configuration is particularly useful if there is not much space available, in particular laterally in relation to the main conveying track. Resorting can then take place in the "height-wise" direction.

Furthermore, it has proven to be advantageous if the transfer device is a pusher by means of which a container can be displaced between the exchange points.

A pusher is technically less susceptible than a roller conveyor. It can also be replaced more easily than a roller conveyor. The pusher is straightforward to activate.

According to a further embodiment, the transfer device has motor-operated conveyor rollers which can be driven in two opposite directions.

This ensures that it is possible to change over containers between the exchange points in any desired direction. Just a single apparatus is necessary for this purpose. If use is made of pushers, two pushers are necessary.

According to an advantageous configuration, the conveying-track circuit also has a parking track on which containers which are to be sorted can be parked on an interim basis.

A parking track is advantageous, in particular, when it is necessary to shift a plurality of containers in respect of the sequence. These containers can be discharged from the main flow on the main conveying track. Other containers can be shifted, and thus re-sorted, relative to the group which is located on the parking track. The group can then be reintegrated in the main flow.

Furthermore, the parking track may be utilized, at the same time, as a buffer for containers which have already been pre-sorted.

It is advantageous here, in particular, if motor-operated conveyor rollers are used for the circuit and the parking track, which can rotate both forwards and rearwards.

This makes it easier to move such a group to the front and to the rear in respect of an actual sequence.

Furthermore, it is preferred if only a single transfer device is provided.

A single transfer device limits the computing expenditure which is associated with re-sorting containers, since there is a reduction in the number of options or locations in which overtaking maneuvers can be executed.

Furthermore, it is preferred if the sorting apparatus according to the present invention is used in an order-picking system, the sorting apparatus being connected to a main conveying track.

According to a preferred embodiment, the order-picking system has, upstream of the sorting apparatus, a first sensing means.

The first sensing means is used in order to establish the actual sequence of incoming containers. On the basis of this established sequence, it is then possible to make a comparison with the predetermined sequence in order to determine whether re-sorting has to take place.

According to a preferred embodiment, a second sensing means is provided upstream of the introduction point.

This second sensing means serves to identify a container which is to be introduced into the circuit, in order that the downstream introduction device also actually introduces this container into the circuit.

It is also advantageous to have a third sensing means in the region of the first exchange point.

Here, too, identification is performed of a container which is to be introduced into the circuit.

According to a further preferred embodiment, a fourth sensing means is provided in the region of the second exchange point.

The fourth sensing means serves to identify a container which is to be transported back to the first exchange point, and thus usually also back into the main flow.

According to a further embodiment of the method according to the invention, the execution of the re-sorting commands comprises the following steps: introducing into the circuit all the containers which are to be re-sorted; identifying in the region of the second exchange point the containers which are to be re-sorted; if a container which is to be sorted to the front of the sequence reaches the second exchange point, actuating the transfer device in order to transport this container from the second exchange point to the first exchange point and to introduce it there back into the main conveying track; otherwise advancing within the circuit, to the discharge point of the circuit, the containers which need not be sorted to the front of the sequence; and discharging into the main conveying track, via the discharge device, the containers which are still located within the circuit.

Furthermore, it is preferred if the execution of the re-sorting commands comprises the following further steps: identifying in a region of the first exchange point the containers which are to be re-sorted; if a container which is to be sorted to the front of the sequence reaches the first exchange point, actuating the transfer device in order to transport this container from the first exchange point to the second exchange point and to introduce it there into the circuit and advance it to the discharge point; otherwise advancing to the introduction point of the circuit the containers which need not be sorted to the front of the sequence, in order to introduce them into the circuit and advance them to the discharge point;

and discharging into the main conveying track the containers which are located at the discharge point.

The method steps mentioned above can, in particular, be intermixed.

It is also preferred if the containers are displaced forwards and rearwards, in relation to the main conveying track, within the circuit.

This makes it possible to create relatively large or small gaps between the containers in the circuit.

Furthermore, it is preferred if the main conveying track and the conveying-track circuit are constructed from conveying-track segments which are operated at variable conveying speeds. The containers may thus be transported in an accelerated or slowed-down state, and this creates or closes gaps in the sequence of containers. This is important, in particular, when there is no space between containers on the main conveying track in order for containers from the circuit to be reintegrated in the main conveying track.

Of course, the features which have been mentioned above, and those which are yet to be explained hereinbelow, can be used not just in the combination specified in each case, but also in other combinations, or on their own, without departing from the framework of the present invention.

BRIEF DESCRIPTION OF THE DRAWINGS

Exemplary embodiments of the invention will be explained in more detail in the following description and are illustrated in the drawing, in which.

DESCRIPTION OF PREFERRED EMBODIMENTS

Figure 1:
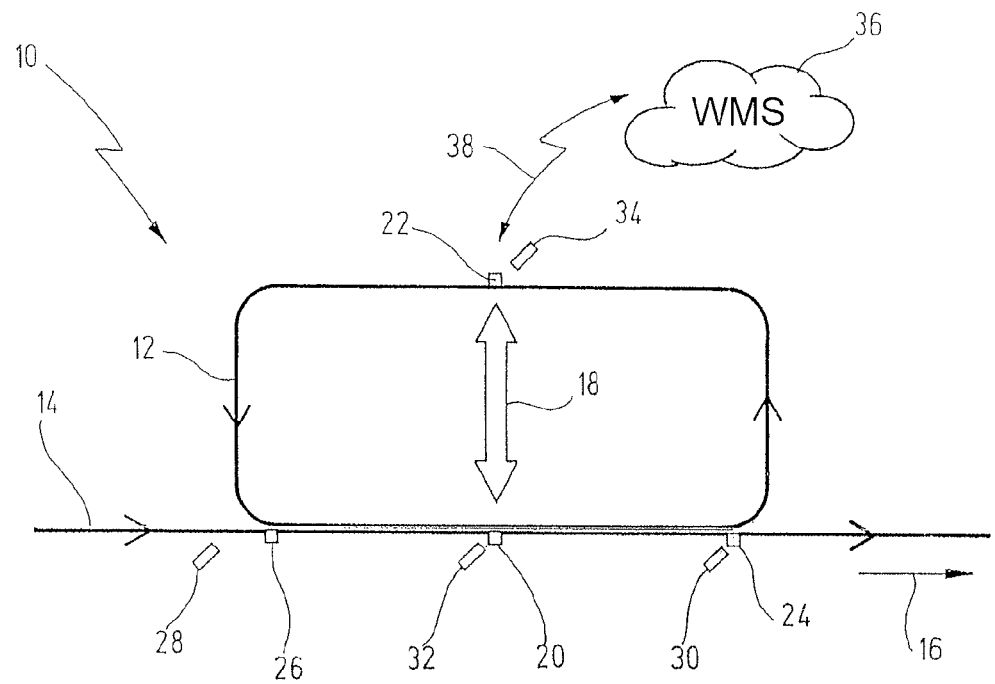
FIG. 1 shows a plan view of a schematic sorting apparatus according to the present invention which is connected, by way of example, to a main conveying track of an order-picking system.

Like elements hereinafter are provided with like reference numerals in the figures. The sorting apparatus according to the invention is designated in general terms by the reference numeral 10, and modified embodiments are indicated by prime strokes.

FIG. 1 shows a sorting apparatus 10 according to the present invention. The sorting apparatus 10 comprises a conveyor circuit 12. The conveyor circuit 12 may be in the form of a roller conveyor, conveying belts, an overhead conveyor or the like. The conveyor circuit 12, which will also be referred to hereinbelow just as a circuit, is connected to a main conveying track 14, which may be formed from components similar or identical to those of the circuit 12.

The main conveying track 14 is operated from left to right in the example of FIG. 1 in order to convey containers (not illustrated here). The main conveying direction is illustrated by an arrow 16. The main conveying track 14 usually connects a container rack (not illustrated) of an order-picking system (not illustrated) to order-picking workstations (not illustrated), at which the actual order picking then takes place, and vice versa.

As far as the circuit 12 is concerned, furthermore, a transfer device 18 is arranged within the circuit 12, and is depicted by a double arrow. The transfer device 18 can be actuated here in the directions indicated by the arrow 18. However, it would also be possible for the transfer device 18 to be actuated just in one direction. This is the case, for example, when the transfer device 18 is a pusher.

The transfer device 18 which is shown in FIG. 1 connects a first transfer point 20 to a second transfer point 22 of the circuit 12. Between the transfer points 20 and 22, containers can be shifted in any desired direction. Via an introduction point 24, the containers are introduced into the circuit and, via the discharge point 26, the containers are discharged from the circuit and reintroduced into the main conveying track. Introduction devices and discharge devices (not explained any more specifically here) are provided for this purpose.

In the case of the example which is depicted in FIG. 1, the circuit 12 is a closed loop. However, it would also be possible for the circuit 12 and the main conveying track 14 to have a portion in common, namely when only one track is provided between the discharge point 26 and the introduction point 24 and is used jointly both by the main conveying track 14 and by the circuit 12.

It is particularly advantageous if the first exchange point 20 likewise has an introduction device and a discharge device. It is thus possible for the transfer device 18 to introduce containers 40 from the main conveying track 14 into the circuit 12 and, vice versa, to discharge containers 40 from the circuit 12 in order to introduce them into the main conveying track 14.

In order to be able to establish the sequence in which containers are generally transported in the direction of the circuit 12, a first scanner 28 is for example provided upstream of the circuit 12. The scanner 28 may be a barcode scanner which reads barcodes which are provided on each container. The container can be identified via the barcode.

Of course, it would also be possible to use other means of identification. For example, it would be possible for each container 40 to have, for example, a transponder with a dedicated frequency or dedicated code, in order thus to be identified in relation to a reading means 28.

A further scanner 30 may be provided upstream of the introduction point 24 in order to identify containers which are to be introduced into the circuit 12. The same applies to the transfer device 18. A further scanner 32 may be provided upstream of the first exchange point 20. The scanner 32 can identify containers which are transported either in the circuit 12 or on the main conveying track 14. If a container which is to be moved from the first exchange point 20 to the second exchange point 22 passes the scanner 32, the latter emits a corresponding signal 32 to a higher-level unit, which is yet to be described in more detail, which higher-level unit then initiates a corresponding transfer movement. The same applies to a container which is to be discharged from the circuit 12.

In order for allowing to initiate transfer between the second exchange point 22 and the first exchange point 20, a further scanner 34 may be provided upstream of the second exchange point 22.

Any action in the circuit 12, be this in the form of introduction, discharge or displacement, is controlled by a higher-level warehouse-management system 36, which is depicted in FIG. 1 in the form of a cloud.

Communication between the warehouse-management system 36 and the individual control elements 20-26 can take place wirelessly, as is indicated by way of example by an arrow 38. However, connection may also take place via cables, in particular via a bus system (e.g. Profibus).

A sorting operation according to the present invention will be described hereinbelow with reference to FIGS. 2a to 2e. The sorting apparatus 10 which is used in FIG. 2 corresponds to the sorting apparatus shown in FIG. 1, the circuit 12 and the main conveying track 14 sharing a portion in common (cf. track between points 26 and 24 in FIG. 1). The main conveying direction, once again, runs from left to right. The main conveying direction within the circuit 12 is anticlockwise. The transfer device 18 allows the movement of containers between the two transfer points. In order to simplify matters, the individual illustrations of FIG. 2 do not always contain all the designations, but it should not be concluded from this that the elements which are shown in FIG. 1 are not present.

FIG. 2a shows an example of a starting situation in which seven containers 40 are transported on the main conveying track 14 in the direction of the circuit 12. The containers 40 are numbered from right to left by the numerals 1 to 7. It can be seen that the first three containers are arranged in the correct sequence. Container no. 3, however, rather than being followed by container no. 4, is followed by containers no. 5 and no. 6. Container no. 4, in turn, follows container no. 6. This means that container no. 4 should overtake containers no. 5 and no. 6 in order for the seven containers 40 to be arranged in the correct sequence. Container no. 4 thus has to be moved two places to the front. Of course, it is only for illustrative purposes that so few containers are depicted. The system according to the invention is able to handle many more containers at the same time.

Figure 2:
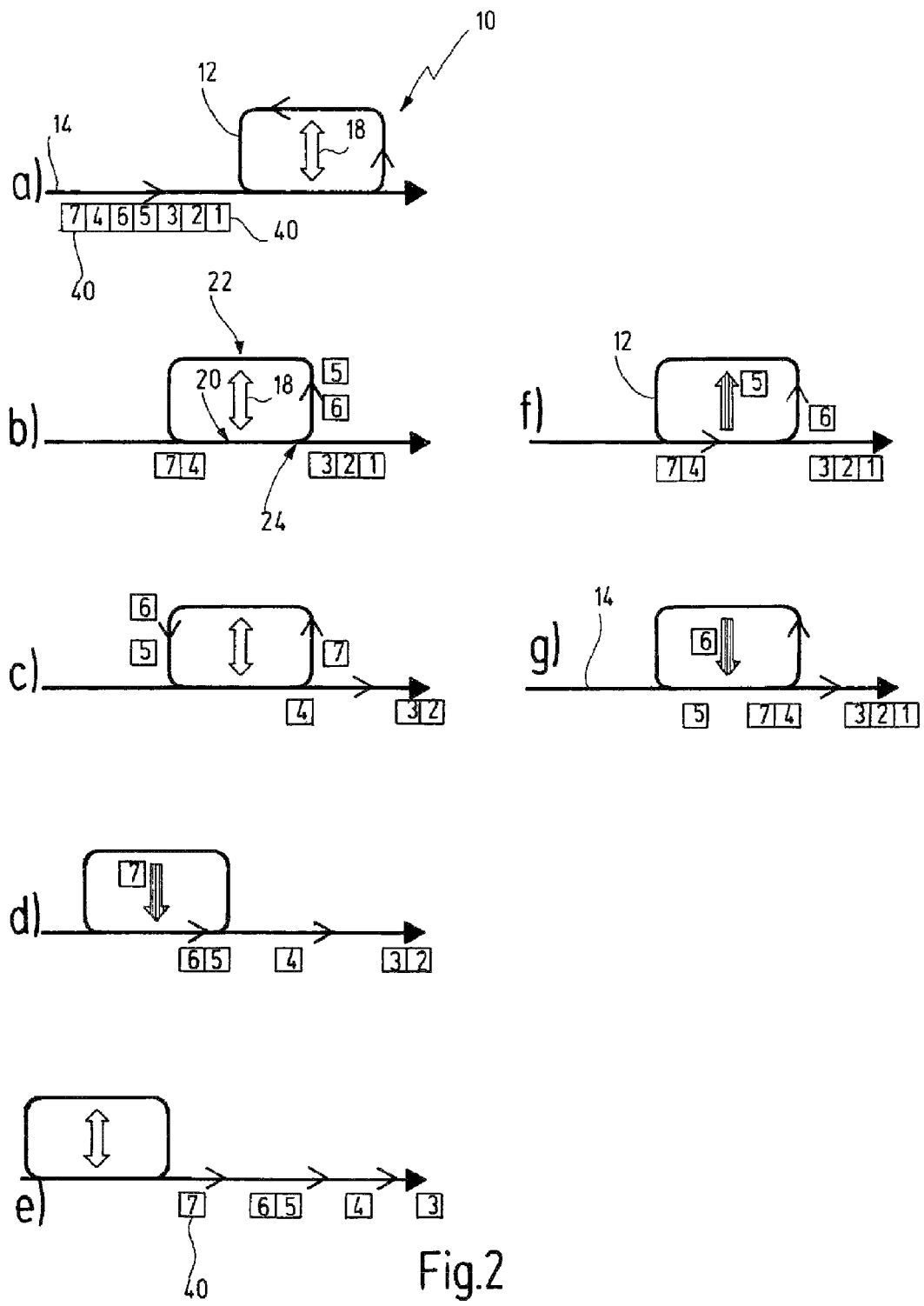
FIGS. 2a to 2e show a schematic course of sorting seven containers which are originally supplied in an incorrect sequence.
FIGS. 2f and 2g show an alternative to the method steps illustrated in FIGS. 2b and c.

FIG. 2b shows the situation in which the first three containers 40 have already passed the circuit 12. The scanner 28 has been used beforehand to determine the container sequence upstream of the circuit 12 and to pass this sequence on to the warehouse-management system 36, which is not illustrated in FIG. 2 but may be implemented, for example, by a host computer. The warehouse-management system 36 is equipped with means for computing appropriate instructions in order for the "incorrect" sequence to be corrected in optimum fashion by way of re-sorting commands. These computing operations, of course, require a certain amount of time, in which case it is particularly preferred if the scanner 28 (cf. FIG. 1) is arranged a relatively long way upstream of the circuit 12.

It can also be seen in FIG. 2b that container nos. 5 and 6 have been introduced via the introduction point 24 into the right-hand branch of the circuit 12 in FIG. 2. Container nos. 4 and 7 are located upstream of the first exchange point 20.

FIG. 2c shows the situation in which container no. 4, once it has been read by the scanner 32 (cf. FIG. 1), has been allowed past the first exchange point 20. After corresponding identification at the introduction point 24, in contrast, container no. 7 has been introduced into the right-hand branch of the circuit 12. Container nos. 5 and 6, in the meantime, have moved on within the circuit 12 to the left-hand branch of the latter.

This is followed, a little later, by the situation illustrated in FIG. 2d. Container nos. 5 and 6 have been discharged out of the circuit 12 via the discharge point 26 and reintroduced into the main conveying track 14. Container no. 7 can already be moved, via the transfer device 18, from the second exchange point 22 in the direction of the first exchange point 20 in order not to have to pass through the rest of the circuit 12. The movement of container no. 7 on the transfer device 18 from the second exchange point 22 to the first exchange point 20 is depicted in FIG. 2d by an arrow having a dark-coloured hatching.

This is followed, a little later, by the situation illustrated in FIG. 2e. Container no. 7 has been reintegrated, via the first exchange point 20, into the main conveying track 14. All the containers 40 are then located in the correct sequence. Container no. 4 has been moved two places to the front.

It can also be seen in FIGS. 2a to 2e that the various actions have created gaps between the containers 40. This only takes place, however, when the main conveying track 14 is driven at a constant speed, i.e. without any interruption. It is advantageous here if the flow of containers on the main conveying track is uninterrupted. This is important, in particular, when a plurality of order-picking stations are connected to the main conveying track 14. An interruption in the main flow would result in the order-picking workstations being undersupplied, which it is imperative to prevent. This is of interest, in particular, when a large number of order-picking workstations are supplied simultaneously with containers from the main conveying track 14. In this case, containers belonging to one order-picking workstation often mix with containers belonging to other order-picking workstations.

It can also be ascertained that the length of the path to be covered in the circuit 12 can be varied by the transfer device 18. Container nos. 5 and 6 can pass through the circuit 12, for example, in its entirety. Container no. 7, however, has covered a much shorter path in the circuit 12 since it was reintegrated early into the main conveying track 14 by means of the transfer device 18.

The transfer device 18 opens up a wide range of options as to how the containers 40 can be re-sorted, in particular as to the size of the gaps between the containers 40 on the main conveying track 14 once they have passed the sorting apparatus 10.

FIGS. 2f and 2g show alternatives to the situations which are illustrated in FIGS. 2b and 2c.

Instead of moving container nos. 5 and 6 into the right-hand branch of the circuit 12, as is depicted in FIG. 2b, it would also be possible for container no. 5 to be discharged from the main conveying track 14 using the transfer device 18. This alternative is illustrated in FIG. 2f. Container no. 6 here has been introduced into the right-hand branch of the circuit 12 via the introduction point 24.

As can be seen in FIG. 2g, container no. 5 can then pass through the left-hand branch of the circuit 12 in order to be discharged from the circuit 12, via the discharge point 26, directly downstream of container no. 7. Container no. 7 is introduced into the circuit 12 at the introduction point 24. A little later, container no. 5 has passed the first exchange point 20, in which case container no. 6 can be reintegrated in the main conveying track 14 via the transfer device 18, while container no. 7 has to pass through the right-hand branch of the circuit 12 in order to be integrated in the main conveying track 14 via the transfer device 18.

If the re-sorting operation is carried out in this (alternative) manner, this logically gives rise to different gaps between the containers on the main conveying track 14, in particular when the main conveying track 14 is operated at constant speed without any interruption.

It is obvious to a person skilled in the art that this opens up a wide variety of options as to how containers can best be sorted. This variety increases further if the sorting apparatus 10' of FIG. 3 is taken into account.

Figure 3:
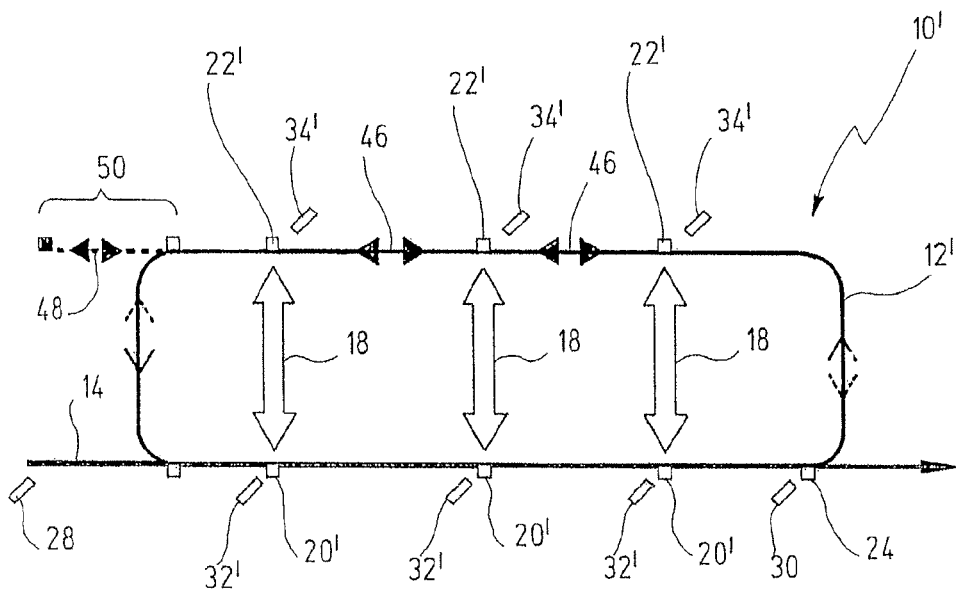
FIG. 3 shows a schematic top view of a further embodiment of a sorting apparatus according to the present invention.

A plurality of transfer devices 18, in this case a total of three transfer devices, are illustrated for the sorting apparatus 10' of FIG. 3. Each transfer device 18 is assigned a first exchange point 20' and a second exchange point 22'. Each of the exchange points 20' and 22' may, in turn, be assigned a respective scanner 32' and 34'. The circuit 12' of FIG. 3 differs from the circuit 12 of FIG. 1, inter alia, in that the conveyors used can be moved in opposite directions, as is indicated by way of example by the double arrows 46. This functionality may be provided throughout the circuit 12'. As an alternative, it is possible for just some sections of the circuit 12' to be moved in both directions, for example the conveying-track sections between the respective second exchange points 22'.

It is optionally also possible to provide a parking track 50, which is illustrated by dotted lines in FIG. 3. The parking track 50 may likewise be driven and/or actuated in both directions (cf. arrow 48). The use of motor-operated convey- or rollers, in particular, has proven successful for this configuration of sorting apparatus. Entire groups of containers 40 (not illustrated here) can be "parked on an interim basis" on the parking track 50. Assuming that such a group of containers parked on an interim basis would have to be shifted relatively far to the rear of the sequence of containers, then parking on an interim basis on the parking location 50 is highly advantageous since, in this case, the operation of the sorting apparatus 10' can be continued without disruption. The group which is parked on an interim basis can be reintegrated in the circuit 12' at a suitable point in time, in order, finally, to be reintegrated in the main conveying track 14.

Of course, providing a plurality of, in this case three, transfer devices drastically increases the number of options as to how containers can be displaced in respect of the sequence.

This applies all the more if it possible for the main conveying track 14 to be braked, in particular upstream of the circuit 12', because a very large quantity of containers can then be re-sorted relatively quickly in the sorting apparatus 10'. Following re-sorting, conveying on the main conveying track can be resumed.

It is even more advantageous if the conveying tracks are subdivided into segments which can be operated at variable speeds, in particular with accelerating or decelerating action. Both the sorting apparatus 10' and the main conveying track 14 may be constructed from such conveying-track segments. These conveying-track segments can be used to accelerate and slow down containers, in which case it is possible to increase or reduce the gaps existing between the containers.

Figure 4:
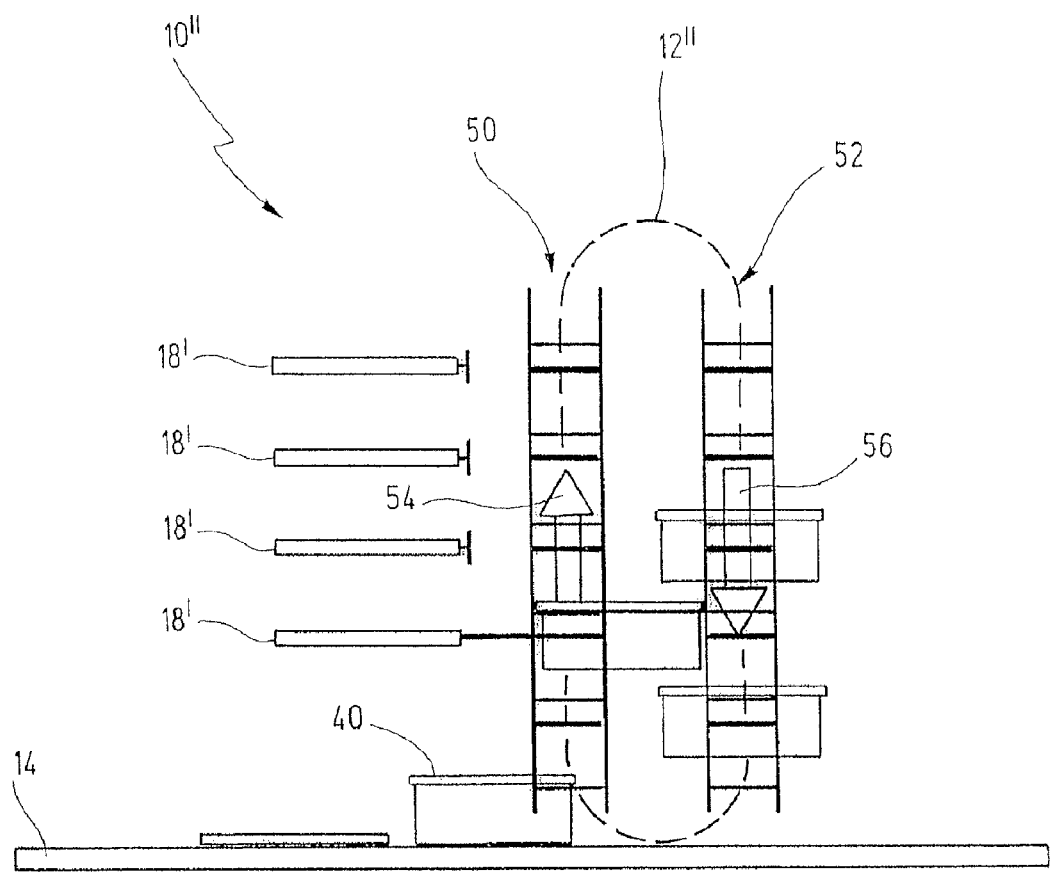
FIG. 4 shows a schematic side view of a further, vertically constructed sorting apparatus according to the invention.

FIG. 4 shows a schematic side view of a further embodiment of a sorting apparatus 10" according to the present invention. In contrast to the previously explained sorting apparatuses according to the present invention, the circuit 12" in FIG. 4 is arranged in a vertical plane relative to the plane of the main conveying track 14. The circuit 12" of the sorting apparatus 10" comprises two paternosters 50 and 52. The paternoster 50 is responsible for moving containers 40 upwards. The paternoster 52 is responsible for moving containers 40 downwards.

A plurality of pushers 18' are arranged laterally and at different heights. The pushers 18' can be used to move containers 40 from the paternoster 50 to the paternoster 52 at different heights.

If a container 40 has reached a predetermined height in the upward direction, as is indicated with the aid of the arrow 54, then it is pushed, by a suitable pusher 18', onto the paternoster 52, in order to move downwards (cf. arrow 56) in the direction of the main conveying track 14, on which the containers 40 are moved from left to right in the example of FIG. 4. Following the sorting operation, the containers are stored in the paternoster 52, depending on the sorting rule, in ascending or descending order. The downward movement of the paternoster 52 reintegrates the pre-sorted containers on the main conveying track 14.

Figure 5:
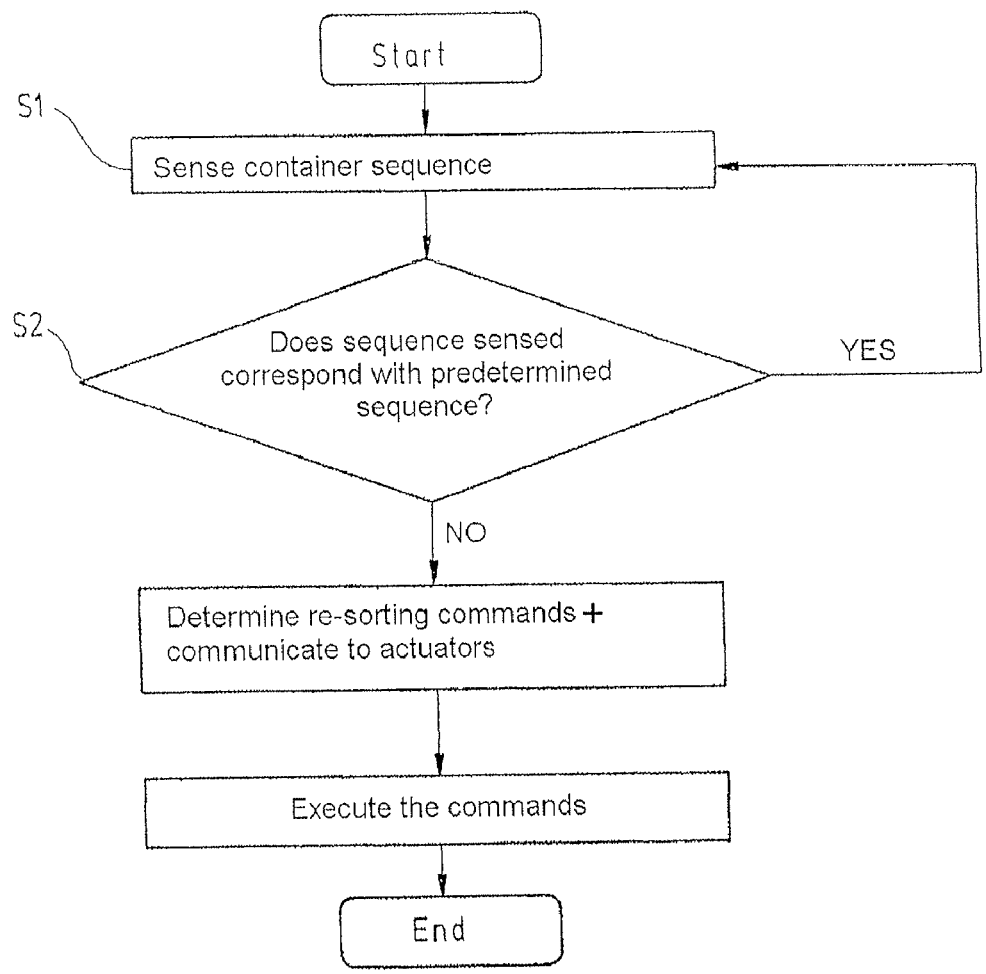
FIG. 5 shows a flow diagram of the method of the present invention.

A method for sorting according to the present invention will be described hereinbelow with reference to FIG. 5. In this context, reference is also made to the re-sorting method which has already been explained in conjunction with FIGS. 2a to 2f.

According to the method of the invention, in a first step (S1), a sequence of containers which are conveyed downstream via a main conveying track is sensed. In a second step, the sequence sensed is checked in relation to a predetermined sequence (cf. S2). Should the sequences not correspond, then the incorrectly sorted containers, for which the sequence is incorrect, are introduced into the circuit, re-sorting commands are determined by a warehouse-management system and are communicated to the transfer device and/or to the discharge device and the introduction device in order to bring about the shift action.

In order for a container to be sorted "to the front", all the containers which are to be re-sorted are introduced into the circuit. Using the various scanners, the containers which are to be re-sorted are identified at the points of action, e.g. the changeovers points and the introduction point or the discharge point. If a container which is to be sorted to the front of the sequence reaches the second exchange point, the transfer device is actuated in order to transport this container from the second exchange point to the first exchange point. There, this container is then reintroduced into the main conveying track. Otherwise the containers which need not be sorted to the front of the sequence are transported, within the circuit, to the discharge point of the circuit in order to be discharged there.

As an alternative, the containers which are to be re-sorted can be identified in a region of the first exchange point. If a container which is to be sorted to the front of the sequence reaches the first exchange point, the transfer device is actuated in order to transport this container from the first exchange point to the second exchange point and to introduce it into the circuit there. It is then advanced to the discharge point in order to be reintroduced into the main conveying track there. If a container which need not be sorted to the front of the sequence reaches the first exchange point, this container is advanced to the introduction point of the circuit in order to be introduced there. From there, it is advanced to the discharge point in order, in turn, to be discharged.

Of course, many different types of container and conveyor can be used in order to realize the present invention. The same applies to the means of identification, by way of which each container can be assigned an individual identification number. The use of barcodes and barcode readers has proven to be highly advantageous. However, transponder technology, inter alia, is a further conceivable alternative.

Therefore, what I claim, is:

1. A sorting system for sorting non-sorted containers into a predetermined sequence in an order-picking system, comprising:

a main conveying track by means of which the non-sorted containers are transported within the order-picking system in a main conveying direction, said sorting system having a conveying-track circuit, which is connected to the main conveying track via an introduction point having an introduction device, for introducing containers into the conveying-track circuit, and via a discharge point having a discharge device, for discharging containers which are located in the conveying-track circuit, and having at least one transfer device, which is located the conveying-track circuit and configured to transfer and to exchange containers between a first exchange point and a second exchange point of the conveying-track circuit, wherein, with respect to the main conveying direction, the first exchange point is located between the discharge point and the introduction point, and the second exchange point is located between the introduction point and the discharge point.

2. The sorting system according to claim 1, wherein the discharge point of the conveying-track circuit is upstream of the introduction point, as seen in the main conveying direction.

3. The sorting system according to claim 1, wherein the main conveying track is part of the conveying-track circuit.

4. The sorting system according to claim 1, wherein the conveying-track circuit is a continuous circuit which is independent of the main conveying track.

5. The sorting system according to claim 1, wherein the conveying-track circuit is arranged essentially in a horizontal plane.

6. The sorting system according to claim 1, wherein the main conveying track and the conveying-track circuit are realized by roller conveyors or belt conveyors.

7. The sorting system according to claim 1, wherein the conveying-track circuit is arranged essentially in a vertical plane.

8. The sorting system according to claim 7, wherein the conveying-track circuit comprises paternosters.

9. The sorting system according to one of the preceding claims, wherein the transfer device is a pusher by means of which a container can be shifted between the exchange points.

10. The sorting system according to claim 1, wherein the transfer device has motor-operated conveyor rollers which can be driven in two opposite directions.

11. The sorting system according to claim 1, wherein a portion of the conveying-track circuit is used to park the containers on an interim basis for packing and sorting operations.

12. The sorting system according to claim 11, wherein the conveying-track circuit has motor-operated conveyor rollers which can be operated in opposite directions.

13. The sorting system according to claim 1, wherein precisely one transfer device is provided.

14. An order-picking system having a sorting system, the sorting system comprising a main conveying track by means of which the non-sorted containers are transported within the order-picking system in a main conveying direction, said sorting system having a conveying-track circuit, which is connected to the main conveying track via an introduction point having an introduction device, for introducing containers into the conveying-track circuit, and via a discharge point having a discharge device, for discharging containers which are located in the conveying-track circuit, and having at least one transfer device, which is located in the conveying-track circuit and is configured to transfer and to exchange containers between a first exchange point and a second exchange point of the conveying-track circuit, and the order-picking system comprises the main conveying track which is connected to the sorting system, wherein, with respect to the main conveying direction, the first exchange point is located between the discharge point and the introduction point, and the second exchange point is located between the introduction point and the discharge point.

15. The order-picking system according to claim 14, which also has, upstream of the sorting system, a first sensing device for performing container identification.

16. The order-picking system according to claim 14, having a warehouse-management system for checking a predetermined container sequence and, if the sequence is not correct, issuing sorting instructions to the sorting system.

17. The order-picking system according to claim 14, having a second sensing device upstream of the introduction point.

18. The order-picking system according to claim 14, which, in the region of the first exchange point, has a third sensing device.

19. The order-picking system according to claim 14, having a fourth sensing device in the region of the second exchange point.

* * * * *